United States Patent [19]

Murray

[11] 4,022,636
[45] May 10, 1977

[54] TITANIUM DIOXIDE PIGMENT AND PROCESS FOR MAKING SAME

[75] Inventor: Edward Conley Murray, Oklahoma City, Okla.

[73] Assignee: Kerr-McGee Chemical Corporation, Oklahoma City, Okla.

[22] Filed: Mar. 29, 1976

[21] Appl. No.: 671,430

[52] U.S. Cl. .............................. 106/300; 106/308 B
[51] Int. Cl.² ......................................... C09C 1/36
[58] Field of Search .......................... 106/300, 308 B

[56] References Cited

UNITED STATES PATENTS

| | | | |
|---|---|---|---|
| 3,251,705 | 5/1966 | Rieck et al. ....................... | 106/300 |
| 3,523,810 | 8/1970 | Swank ............................... | 106/300 |
| 3,767,455 | 10/1973 | Claridge et al. .................. | 106/300 |
| 3,770,470 | 11/1973 | Swank ............................... | 106/300 |

Primary Examiner—Winston A. Douglas
Assistant Examiner—J. V. Howard
Attorney, Agent, or Firm—William G. Addison

[57] ABSTRACT

The present invention provides an improved process for coating titanium dioxide with precipitated alumina (aluminum oxide) for use as a pigment in plastics wherein a first coating of amorphous alumina is precipitated onto the titanium dioxide and then a second coating of crystalline alumina is precipitated over the first coating. In operation, the pH of an aqueous slurry of titanium dioxide pigment is adjusted to be within a first pH range as the first alumina coating is effected by adding an amount of sodium aluminate to the aqueous slurry and then the pH of the slurry is adjusted to be within a second pH range while a second amount of sodium aluminate is added to form the second coating over the first coating. The present invention also contemplates an improved titanium dioxide pigment having a first coating of amorphous alumina and a second coating of boehmite alumina.

11 Claims, No Drawings

TITANIUM DIOXIDE PIGMENT AND PROCESS FOR MAKING SAME

BACKGROUND OF THE INVENTION

1. Field of the Invention

The present invention relates generally to improved titanium dioxide pigments and, more particularly, but not by way of limitation, to an improved titanium dioxide pigment having a first coating of amorphous alumina and a second coating of boehmite alumina.

2. Description of the Prior Art

Titanium dioxide has found extensive use as a pigment material in a wide range of applications. Certain characteristics of the pigment have been enhanced by coating the pigment with a hydrous metal oxide. For example, the weathering character of the pigment has been improved by coating the pigment with aluminum oxide.

Various types of coatings have been applied to titanium dioxide pigments and various processes have been developed for applying such coatings. For example, U.S. Pat. No. 3,086,877, issued to Sheehan et al, disclosed a process wherein a strong acid was added to an aqueous slurry of titanium dioxide to adjust the pH to below about 4.0, and a sufficient amount of sodium aluminate was then added to the slurry to bring the pH of the slurry mixture up to a value of between 6.0 and 8.0. According to the Sheehan patent, this particular process produced an alumina coated titanium dioxide pigment having superior weathering properties.

In some applications, multiple coatings of hydrous metallic oxides have been applied to titanium dioxide. The Rechmann patent, U.S. Pat. No. 3,203,818, disclosed a process for applying two oxide coatings by subjecting the pigment to a first coating treatment, a calcination treatment, and then a second coating treatment, which was applied in a manner similar to the first coating treatment. The Allan patent, U.S. Pat. No. 3,383,231, disclosed the coating of titanium dioxide pigments with the oxides of at least two metals. The Allen patent, U.S. Pat. No. 3,897,261, disclosed the coating of titanium dioxide pigments with successive coatings of silica and alumina until a total of four oxide coatings were applied to the pigment.

In general, many prior art processes involved the addition of a water soluble metal salt to an aqueous slurry of titanium dioxide, and the addition of a pH adjusting agent to neutralize the slurry and to form insoluble hydrous oxides on the pigment. In addition to those patents specifically mentioned above, the following patents disclosed various processes for coating titanium dioxide pigments: U.S. Pat. No. 2,284,772 issued to Seidel; U.S. Pat. 2,357,101 issued to Geddes; U.S. Pat. No. 3,251,705 issued to Rieck et al; U.S. Pat. No. 3,409,454 issued to Andrew et al.; U.S. Pat. No. 3,418,147 issued to Fields; U.S. Pat. No. 3,459,575 issued to Andrew et al.; U.S. Pat. No. 3,510,344 issued to Goodspeed; U.S. Pat. No. 3,515,566 issued to Moody et al.; U.S. Pat. No. 3,545,994 issued to Lott, Jr. et al.; U.S. Pat. No. 2,671,031 issued to Whateley; U.S. Pat. No. 3,567,478 issued to Dietz et al.; U.S. Pat. No. 3,591,398 issued to Angerman; U.S. Pat. No. 3,595,822 issued to Swank; U.S. Pat. No. 3,660,129 issued to Luginsland; U.S. Pat. No. 3,770,470 issued to Swank; and U.S. Pat. No. 3,859,109 issued to Wiseman et al.

DESCRIPTION OF THE PREFERRED EMBODIMENTS

Various problems have been encountered in processing titanium dioxide pigments which are used in plastics and which have been coated via prior processes, such as the various processes specifically referred to before, for example. More particularly, various problems have been encountered in the filtration of such coated, plastic grade pigments and in the micronizing or milling of such coated, plastic grade pigments. Referring particularly to the milling of such plastic grade, coated titanium dioxide pigments, the pigment is sticky and tends to stick to the milling apparatus and the material handling apparatus utilized in conjunction with the milling operation. The sticking of the pigment to the various apparatus makes it extremely difficult to load the pigment into the milling apparatus and to remove the pigment from the milling apparatus after the completion of the milling operation. Further, the sticking of the pigment tends to plug or foul the milling apparatus which increases the maintenance expenses and the maintenance time required to maintain the milling equipment operational.

It has been found that the plastic grade titanium dioxide pigment of the present invention has less of a tendency to stick to the milling apparatus and the various devices associated with the milling process and, in general, the titanium dioxide pigment of the present invention has substantially improved material handling characteristics with respect to one particular process, it was found that the process of the present invention substantially reduced the manufacturing cost and the production rate was essentially doubled while producing a plastic grade titanium dioxide pigment with equal or superior overall properties as compared to plastic grade titanium dioxide pigment produced via prior processes.

The structure of the alumina coating on titanium dioxide pigment varies with the pH range in which the hydrous oxide is precipitated. It has been found that alumina precipitated in an acidic range is of an amorphous form, while alumina precipitated in a basic pH range is of a crystalline form or, more specifically, of a boehmite form or type. The boehmite form of alumina coating provides the desired characteristics for the titanium dioxide pigment, while the amorphous form of alumina coating improves the handling characteristics associated with the manufacturing processes involved in producing the pigment.

It has been found that titanium dioxide coated with about 1% alumina possesses superior handling properties when approximately half of the alumina coating is precipitated from an acidic medium (providing an amorphous alumina) and the remaining portion of the alumina coating is precipitated in a basic pH range (producing a boehmite alumina). Thus the present invention contemplates an improved process for adding or applying multiple layers of alumina in a single process treatment.

In accordance with the present invention, an aqueous slurry of titanium dioxide is prepared (a floccing agent may be added if desired in a particular application). A first coating of alumina is formed on the pigment by adjusting the pH of the slurry to a level within a first pH range, the pH of the slurry preferably being below about 2.0, and then adding a sufficient amount of basic aluminum salt to produce the first alumina coating and to adjust the pH to a level between about 8.0 and 9.0. Following the formation of the first coating, a second coating of alumina is precipitated onto the pigment by adding additional basic aluminum salt while maintaining the pH of the slurry within a second pH range, the second pH range preferably being at the level between about 8.0 and 9.0.

After the final addition of basic aluminum salt, the pigment may be digested if desired. In one particular process, the digestion is accomplished by subjecting the slurry to a temperature of between about 120° F and 140° F for approximately 15 minutes.

The improvements in the handling characteristics of titanium dioxide pigment coated with the dual amorphous and boehmite alumina coatings of the present invention are demonstrated by the results appearing in TABLE I below:

TABLE I

|  | A. %$Al_2O_3$ | B. pH range | C. Cake (mm) | D. Milling | E. Plastic |
|---|---|---|---|---|---|
| Test 1 | 0.5 | 8.0–9.0 | 5.0 | Poor | Good |
| Test 2 | 0.5 | 8.0–9.0 | 3.5 | Fair | Marginal |
| Test 3 | 0.5 | 2.0–7.5 | 14.0 | Bad | — |
| Test 4 | 1.0 | 8.0–9.0 | 6.0 | Fair | Acceptable |
| Test 5 | 1.0 | 8.0–9.0 | 5.0 | Good | Marginal |
| Test 6 | 1.0 | 2.0–9.0 | 13.0 | Good | Good |

Each of the tests reported in the TABLE I involved a pigment coated by a process involving the addition of sodium aluminate to an aqueous slurry of titanium dioxide at a controlled pH range as shown in column B of TABLE I. The use of sodium aluminate is convenient because of its capacity to increase the pH level of the aqueous slurry. The pH level of the slurry was adjusted by adding an appropriate amount of acid. It is also possible, and within the contemplation of the invention, to use an acid aluminum salt and then add a basic solution for adjusting the pH level.

Column A of TABLE I indicates the quantity of hydrous oxid coating, expressed as aluminum oxide, that was added to the titanium dioxide for the tests recorded in TABLE I.

The test results recorded in TABLE I generally indicate that better results are obtained when 1% of oxide coating (expressed as aluminum oxide) is provided. That is, the handling characteristics of tests 4 through 6 (1% $Al_2O_3$) were better than those conducted with lesser amounts of aluminum oxide (0.5% $Al_2O_3$).

Column B of TABLE I provides the pH range of the slurry in which the alumina coating was precipitated. Tests 1 and 4; tests 2 and 5; and tests 3 and 6 represent comparable results at the 0.5% and the 1.0% weight level of alumina coating added, respectively. Tests 1 and 4 were conducted by maintaining the pH of the slurry between about 8.0 9.0. A flocculant consisting of magnesium sulfate was added to the aqueous slurry of tests 2 and 5, and the pH of the slurry was maintained at a level between about 8.0 and 9.0 during the precipitation of the alumina in the manner of tests 1 and 4 (it should be noted the flocculant may consist of any of the soluble alkaline earth metal sulfates, as may be desired in a particular application). Test 3 was conducted in an acidic range of from about 2.0 to about 7.5.

Test 6 was conducted according to the present invention by adding to the aqueous slurry a sufficient amount of sulfuric acid to reduce the pH of the slurry to below about 1.0, then a first quantity of sodium aluminate to raise the pH of the slurry to between 8.0 and 9.0 (this step produces a predominantly amorphous type of alumina coating). Then, a second quantity of sodium aluminate was added to the slurry mixture while simultaneously maintaining the pH between about 8.0 and 9.0 by adding more of the sulfuric acid solution (this step produces an alumina coating which is predominantly boehmite).

Column C of the TABLE I provides the cake thickness of the filtration of the tests which were made on a commercially available leaf filter of the type manufactured by EIMCO Corporation of Salt Lake City, Ut.

Column D of the table indicates the milling characteristics of the alumina coated titanium dioxide. The milling step of the process was accomplished utilizing a fluid energy type of mill (a micronizer) of the type commercially available from such manufacturers as the Sturtevant Mill Company of Boston, Mass., for example. The notations of "Good", "Poor", "Fair", and "Bad" in column D relate to the tendency of the titanium dioxide pigment not to stick to the milling apparatus.

Column E of TABLE I indicates the character of the pigment in a plastic matrix. As shown by the results in TABLE I, the pigment produced in accordance with the present invention in test 6 was the only test that gave good results in both the milling and plastics characteristics, thereby demonstrating the superior handling characteristics achieved by the invention while maintaining the required characteristics of the pigment for use in a plastic matrix.

By way of further illustration, the following example is provided.

EXAMPLE I

An aqueous slurry of titanium dioxide was prepared by adding 1,145 grams of titanium dioxide ($TiO_2$) to a sufficient amount of water to provide a total slurry volume of 3.2 liters. The slurry was heated to 60° C, and 8 milliliters of concentrated sulfuric acid ($H_2SO_4$) was added over a period of about 5 minutes to the slurry to adjust the pH level of the slurry to less than 2.0 and in a range between about 1.5 and about 2.0.

Sodium aluminate solution served as the alumina coating agent, with 41 milliliters of the solution containing an equivalent of 11.5 grams of $Al_2O_3$. This was determined to be adequate to precipitate 1% $Al_2O_3$ based on the weight of $TiO_2$. A first portion (approximately 30 milliliters) of this sodium aluminum solution was added drop-wise to the slurry to raise the pH of the slurry to about 8.7.

Following the above steps, the pH was maintained in a range of 8.4 to 8.7 by adding $H_2SO_4$, while a second portion (approximately 11 milliliters) of the sodium aluminate solution was added drop-wise to the slurry mixture.

After all of the sodium aluminate solution had been added to the slurry, the pH of the slurry was adjusted to 6.0. The slurry was then digested at about 120° F to about 140° F for 15 minutes, and the pH once again was adjusted to 6.0 by adding $H_2SO_4$.

The slurry mixture was filtered and the precipitate was washed with water. A leaf filter produced a 13 millimeter cake in a 20 second immersion and a filtration test was carried out under a vacuum of about 28 inches of mercury. The cake was removed and dried at about 110° C, and the dried product was micronized or milled.

The pigment produced by the above method milled easily and received a good rating in the plastic test.

The above example discloses a process in which a basic aluminum salt and acid are added to the titanium dioxide slurry. While this technique is convenient, other constituents may also be used. For example, it is possible to add acid and aluminate solution, or an acid aluminum salt and a base, simultaneously or in any manner that produces an amorphous alumina precipitate in an amount from about 0.3 to 0.7% based on the weight of the pigment. This first coating then is followed by a second coating of hydrous alumina in an amount from about 0.3 to 0.7% based on the weight of the pigment, the second coating being precipitated under conditions which precipitate alumina predominantly in a boehmite form.

It has been found that the application of the invention reduces the manufacturing cost of plastic grade titanium dioxide pigment and production rates have been essentially doubled through the use of the present invention, while providing a pigment having equal or superior properties to pigment produced by prior processes.

Changes may be made in the process or in the steps of the process or in the sequence of the steps of the process of the present invention without departing from the spirit and scope of the invention as defined in the following claims.

What is claimed is:

1. A coated titanium dioxide pigment, comprising:
   a titanium dioxide pigment;
   a first coating of predominantly amorphous alumina on the titanium dioxide pigment; and
   a second coating of predominantly boehmite alumina on the titanium dioxide pigment and over the first coating.

2. A process, comprising:
   providing an aqueous slurry of titanium dioxide pigment;
   adjusting the pH of the slurry to a level below about 2.0;
   adding a first amount of an alumina coating agent to the slurry to form a first coating of amorphous alumina on the pigment and to increase the pH of the slurry to a level within a range of from about 8.0 to about 9.0;
   adding a second amount of the alumina coating agent to the slurry to form a second coating of boehmite alumina on the pigment and over the first coating; and
   maintaining the pH of the slurry at a level within a range of from about 8.0 to about 9.0 while adding the second amount of the alumina coating agent.

3. The process of claim 2, after adding the second amount of alumina coating agent, defined further to include the step of:
   digesting the slurry at a temperature within a range of from about 120° F to about 140° F.

4. The process of claim 3, after digesting the slurry, defined further to include the steps of:
   filtering the slurry to recover the coated titanium dioxide pigment;
   drying the coated titanium dioxide pigment; and
   milling the coated titanium dioxide pigment.

5. The process of claim 2 wherein the first amount of alumina coating of alumina coating agent is sufficient to provide the first coating within a range of from about 0.3% to about 0.7% by weight based on the weight of the pigment, and the second amount of alumina coating agent is sufficient to provide the second coating within a range of from about 0.3% to about 0.7% by weight based on the weight of the pigment.

6. A process, comprising:
   providing an aqueous slurry of titanium dioxide pigment;
   adding acid to the slurry to adjust the pH of the slurry to a level of less than about 2.0;
   adding a first amount of sodium aluminate solution to the slurry until the pH of the slurry is at a level within a range of from about 8.0 to about 9.0;
   adding a second amount of sodium aluminate solution to the slurry; and
   adding acid to the slurry while adding the second amount of sodium aluminate solution to maintain the pH of the slurry at a level within a range of from about 8.0 to about 9.0.

7. The process of claim 6 wherein the acid is concentrated sulfuric acid.

8. The process of claim 6 wherein the first amount of sodium aluminate is sufficient to effect a precipitation of alumina on the titanium dioxide pigment at a level within a range of from about 0.3% to about 0.7% weight based on the weight of the pigment.

9. The process of claim 8 wherein the second amount of sodium aluminate is adequate to effect a precipitation of alumina on the titanium dioxide pigment at a level within a range of from about 0.3% to about 0.7% weight based on the weight of the pigment.

10. The process of claim 6, after adding the second amount of sodium aluminate solution to the slurry, defined further to include the step of:
    digesting the slurry at a temperature within a range of from about 120° F to about 140° F.

11. The process of claim 10, after digesting the slurry, defined further to include the steps of:
    filtering the slurry to recover the coated titanium dioxide;
    drying the coated titanium dioxide; and
    milling the coated titanium dioxide as required to provide a plastics grade pigment.

* * * * *